United States Patent
Khoshnevisan et al.

(10) Patent No.: US 11,616,613 B2
(45) Date of Patent: Mar. 28, 2023

(54) PDCCH SIGNALING FOR MULTI-TRP WITH DISJOINT RESOURCE BLOCKS

(71) Applicant: QUALCOMM Incorporated, San Diego, CA (US)

(72) Inventors: Mostafa Khoshnevisan, San Diego, CA (US); Xiaoxia Zhang, San Diego, CA (US); Jing Sun, San Diego, CA (US); Farhad Meshkati, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 404 days.

(21) Appl. No.: 16/579,333

(22) Filed: Sep. 23, 2019

(65) Prior Publication Data
US 2020/0100277 A1 Mar. 26, 2020

Related U.S. Application Data

(60) Provisional application No. 62/735,602, filed on Sep. 24, 2018.

(51) Int. Cl.
| | |
|---|---|
| *H04W 72/00* | (2009.01) |
| *H04L 5/00* | (2006.01) |
| *H04W 72/12* | (2023.01) |
| *H04W 72/0453* | (2023.01) |
| *H04W 72/04* | (2023.01) |
| *H04W 72/1273* | (2023.01) |
| *H04L 27/26* | (2006.01) |

(52) U.S. Cl.
CPC ......... *H04L 5/0044* (2013.01); *H04W 72/042* (2013.01); *H04W 72/0453* (2013.01); *H04W 72/1273* (2013.01); *H04W 72/1289* (2013.01); *H04L 5/0048* (2013.01); *H04L 27/2602* (2013.01)

(58) Field of Classification Search
CPC ........... H04W 72/042; H04W 72/0453; H04W 72/1273; H04W 72/1289; H04L 5/0044; H04L 5/0048; H04L 27/2602
See application file for complete search history.

(56) References Cited

U.S. PATENT DOCUMENTS

| | | | |
|---|---|---|---|
| 9,923,684 B2 * | 3/2018 | Ng | H04L 5/0053 |
| 2014/0126490 A1 | 5/2014 | Chen et al. | |
| 2015/0180625 A1 | 6/2015 | Park et al. | |

(Continued)

OTHER PUBLICATIONS

Ericsson: "Feature Lead Summary 3 of Beam Measurement and Reporting", 3GPP Draft; R1-1801187, 3GPP TSG RAN WG1 Meeting AH 1801, Feature Lead Summary 3 of Beam Measurement and Reporting V2, 3rd Generation Partnership Project(3GPP), Mobile Competence Centre, 650, Route Des Lucioles, F-06921 Sophia-Antipolis Cedex, France, vol. RAN WG1, No. Vancouver, Canada, Jan. 22-26, 2018, Jan. 29, 2018, pp. 1-13, XP051385416, Retrieved from the Internet: URL: http://www.3gpp.org/ftp/tsg%5Fran/WG1%5FRL1/TSGR1%5FAH/NR%5FAH%5F1801/Docs/ [retrieved on Jan. 29, 2018], Sections 2.1-2.4, 4.2.1, 4.3, 4.6,7, the Whole Document.

(Continued)

*Primary Examiner* — Khaled M Kassim
*Assistant Examiner* — Zhaohui Yang

(57) ABSTRACT

Aspects of the present disclosure provide techniques for signaling PDCCH with relevant QCL relationships for CE for a UE to use to process a multi-TRP transmission sent using disjoint RBs.

31 Claims, 11 Drawing Sheets

(56) References Cited

U.S. PATENT DOCUMENTS

| | | | | |
|---|---|---|---|---|
| 2020/0008231 | A1* | 1/2020 | Vilaipornsawai | H04W 72/1273 |
| 2020/0022144 | A1* | 1/2020 | Papasakellariou | H04W 72/042 |
| 2020/0053757 | A1* | 2/2020 | Bagheri | H04W 24/08 |
| 2020/0177254 | A1* | 6/2020 | Lee | H04L 5/0051 |
| 2021/0235453 | A1* | 7/2021 | Matsumura | H04L 5/0035 |

OTHER PUBLICATIONS

Ericsson: "Non-Codebook based UL MIMO Remaining Details", 3GPP TSG-RAN WG1 #91, 3GPP Draft; R1-1720739 Non-Codebook based UL MIMO Remaining Details, 3rd Generation Partnership Project (3GPP), Mobile Competence Centre; 650, Route Des Lucioles; F-06921 Sophia-Antipolis Cedex; FR, vol. RAN WG1, No. Reno, USA; Nov. 18, 2017, pp. 1-6, XP051370196, Retrieved from the Internet: URL: http://www.3gpp.org/ftp/tsg%5Fran/WG1%5FRL1/TSGR1%5F91/Docs/ [retrieved on Nov. 18, 2017] figures 1-3, sections 1-3.

International Search Report and Written Opinion—PCT/US2019/052617—ISA/EPO—dated Apr. 20, 2020.

Partial International Search Report—PCT/US2019/052617—ISA/EPO—dated Jan. 2, 2020.

Samsung: "On DL QCL for NR," R1 -1705358, 3GPP TSG RAN WG1 #88b, Spokane, USA, Apr. 3-7, 2017, 6 pages, DL QCL V1, 3rd Generation Partnership Project (3GPP), Mobile Competence Centre ; 650. Route Des Lucioles ; F-06921 Sophia-Antipolis Cedex; France, vol. RAN WG1. No. Spokane. USA; Apr. 3, 2017-Apr. 7, 2017, Mar. 24, 2017 (Mar. 24, 2017), XP051250921, Retrieved from the Internet: URL: http://www.3gpp.org/ftp/tsg_ran/WG1_RL1/TSGR1_88b/Docs/ [retrieved on Mar. 24, 2017], Figures 1. 2; table 1, Sections 1-5.

VIVO: "Discussion on Beam Measurement, Beam Reporting and Beam Indication", 3GPP TSG RAN WG1 Meeting #90bis, 3GPP Draft, R1-1717472_Discussion on Beam Measurement, Beam Reporting and Beam Indication, 3rd Generation Partnership Project (3GPP), Mobile Competence Centre, 650, Route Des Lucioles, F-06921 Sophia-Antipolis Cedex, FR, vol. RAN WG1, No. Prague, CZ, Oct. 9, 2017-Oct. 13, 2017, Oct. 8, 2017 (Oct. 8, 2017), 12 Pages, XP051340660, Retrieved from the Internet: URL: http://www.3gpp.org/ftp/Meetings_3GPP_SYNC/RAN1/Docs/ [retrieved on Oct. 8, 2017] sections 1, 2.1.2, 2.2.1, 2.2.2, 2.3.1, 2.3.2. Section 2.2.2, Section 2.2.3, figure 6.

ZTE, et al., "Details and Evaluation Results on Beam Indication", 3GPP Draft, 3GPP TSG RAN WG1 Meeting #91, R1-1719538 Details and Evaluation Results on Beam Indication, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 27, 2017-Dec. 1, 2017, Nov. 18, 2017 (Nov. 18, 2017), XP051369352, 11 pages, Retrieved from the Internet: URL: http://www.3gpp.org/ftp/tsg%5Fran/WG1%5FRL1/TSGR1%5F91/Docs/ [retrieved on Nov. 18, 2017], figures 1, 3, 2, Sections 1-4, Entirety.

* cited by examiner

PDCCH SIGNALING FOR MULTI-TRP WITH DISJOINT RESOURCE BLOCKS

CROSS-REFERENCE TO RELATED APPLICATIONS

This Patent Application claims priority to U.S. Provisional Patent Application No. 62/735,602 filed Sep. 24, 2018 assigned to the assignee hereof. The disclosure of the prior Application is considered part of and is incorporated by reference in this Patent Application.

FIELD OF THE DISCLOSURE

Aspects of the present disclosure relate to wireless communications, and more particularly, to techniques for processing transmissions for multiple transmission reception points (TRPs).

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a network entity. The method generally includes determining quasi co-location (QCL) parameters for a multi-TRP transmission of a transport block (TB), from the first TRP and at least a second TRP to a user equipment (UE), using at least first and second disjoint sets of resource blocks (RBs), transmitting at least one physical downlink control channel (PDCCH) with frequency domain resource assignment information indicating at least the first set of RBs and at least the QCL relationships, and transmitting the TB to the UE using the first set of RBs, as part of the multi-TRP transmission.

Certain aspects provide a method for wireless communication by a user equipment (UE). The method generally includes receiving at least one physical downlink control channel (PDCCH) scheduling a multi-TRP transmission of a transport block (TB) from at least first and second transmission reception points (TRPs), wherein the PDCCH includes an indication of at least first and second disjoint sets of resource blocks (RBs) and quasi co-location (QCL) parameters, receiving the multi-TRP transmission of the TB on the first and second sets of RBs, and processing the multi-TRP transmission of the TB based on the TRP-specific QCL relationships.

Aspects also include various apparatuses, means, and computer readable mediums having instructions for performing the operations described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
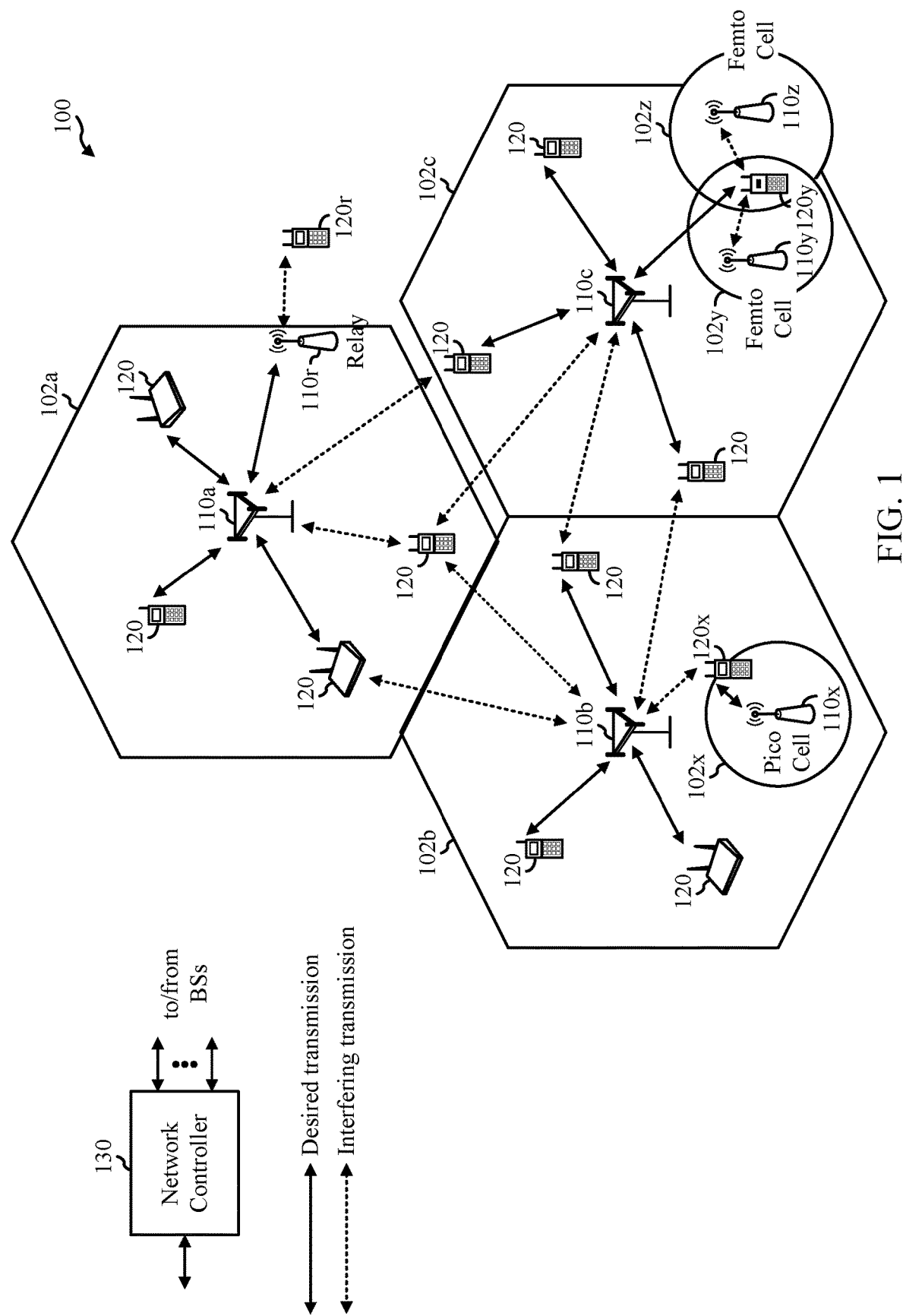
FIG. 1 is a block diagram conceptually illustrating an example telecommunications system, in accordance with certain aspects of the present disclosure.

Aspects of the present disclosure provide apparatus, methods, processing systems, and computer readable mediums for signaling information for processing mutli-TRP transmissions sent using disjoint sets of resource blocks (RBs).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may include one or more base stations 110 that act as (or control) multiple transmitter reception points (TRPs) and configured to perform operations 1000 of FIG. 10 to perform joint transmissions to a UE 120 performing operations 1100 of FIG. 11.

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BSs for the femto cells 102*y* and 102*z*, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110*r* may communicate with the BS 110*a* and a UE 120*r* in order to facilitate communication between the BS 110*a* and the UE 120*r*. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120*x*, 120*y*, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz).

Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
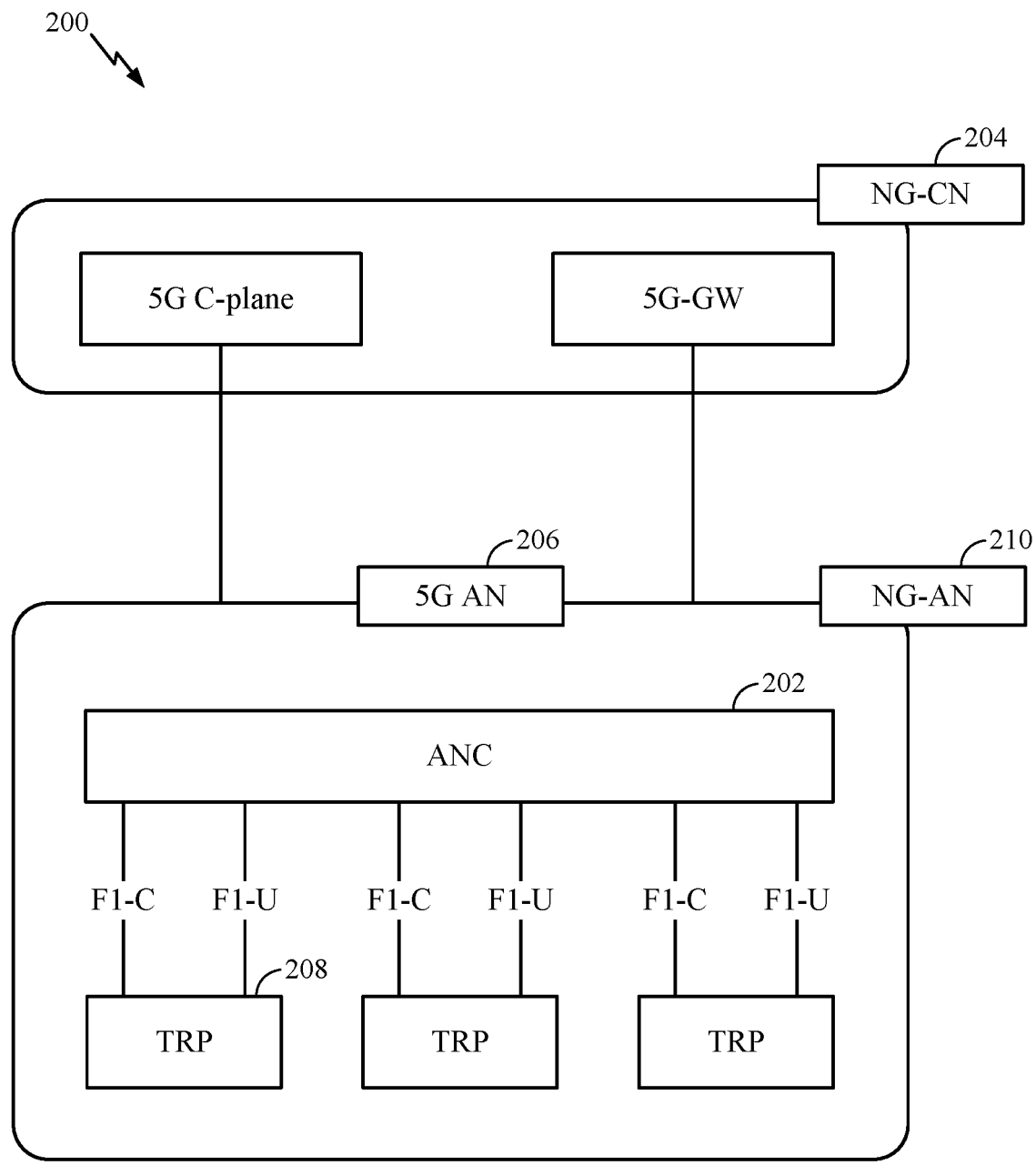
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
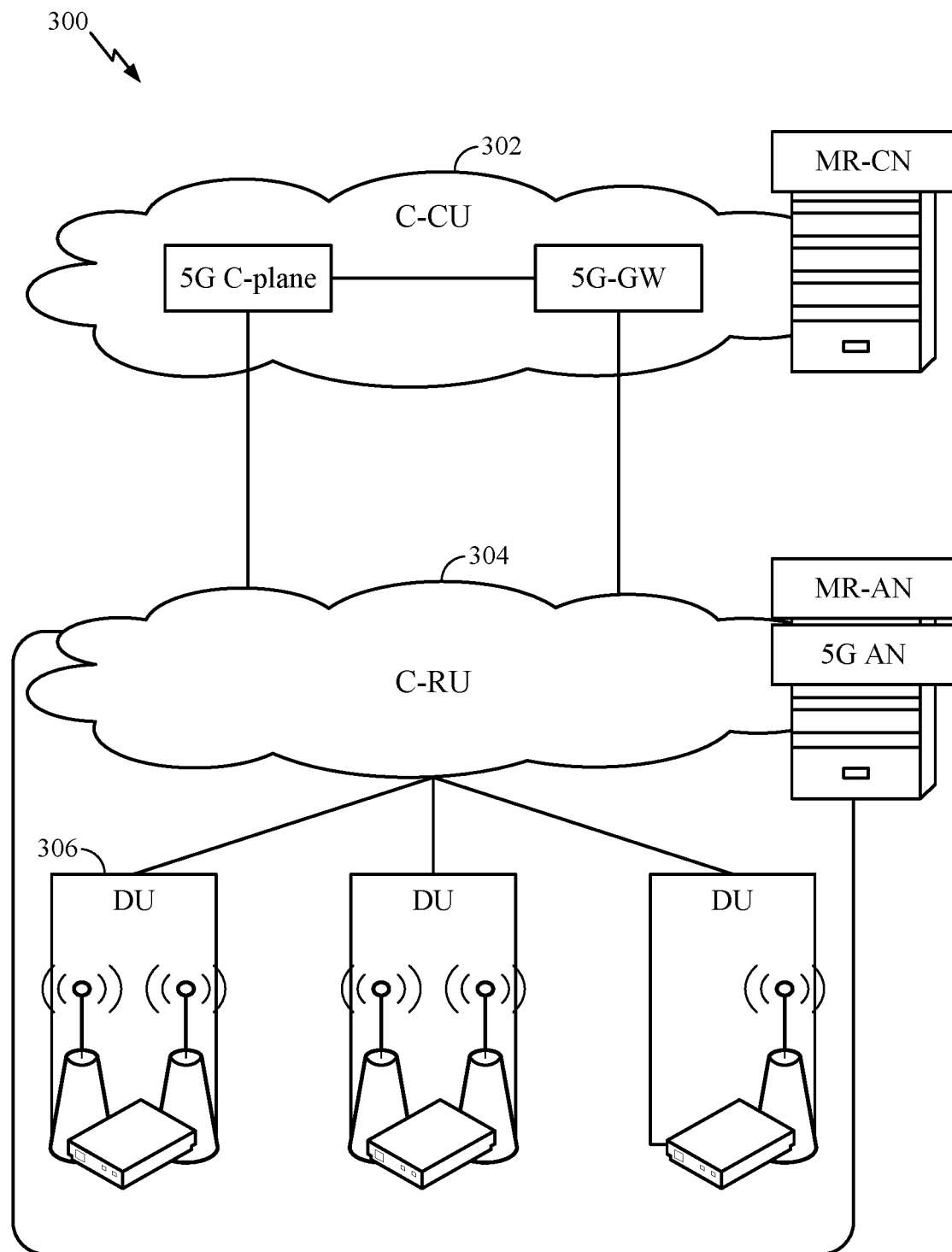
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
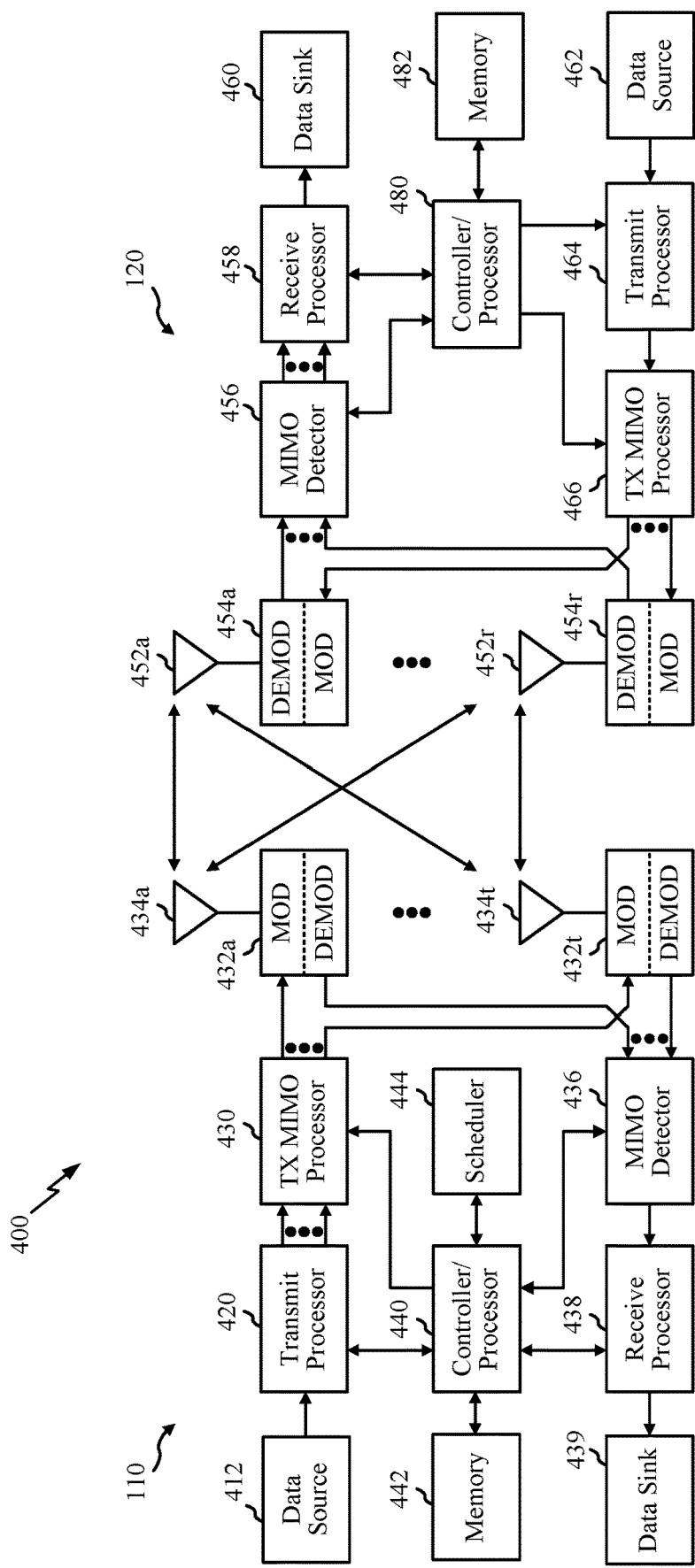
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 430, 438, and/or controller/processor 440 of the BS 110 may be used to perform the various techniques and methods described herein.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432*a* through 432*t*. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH)) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

Figure 10:
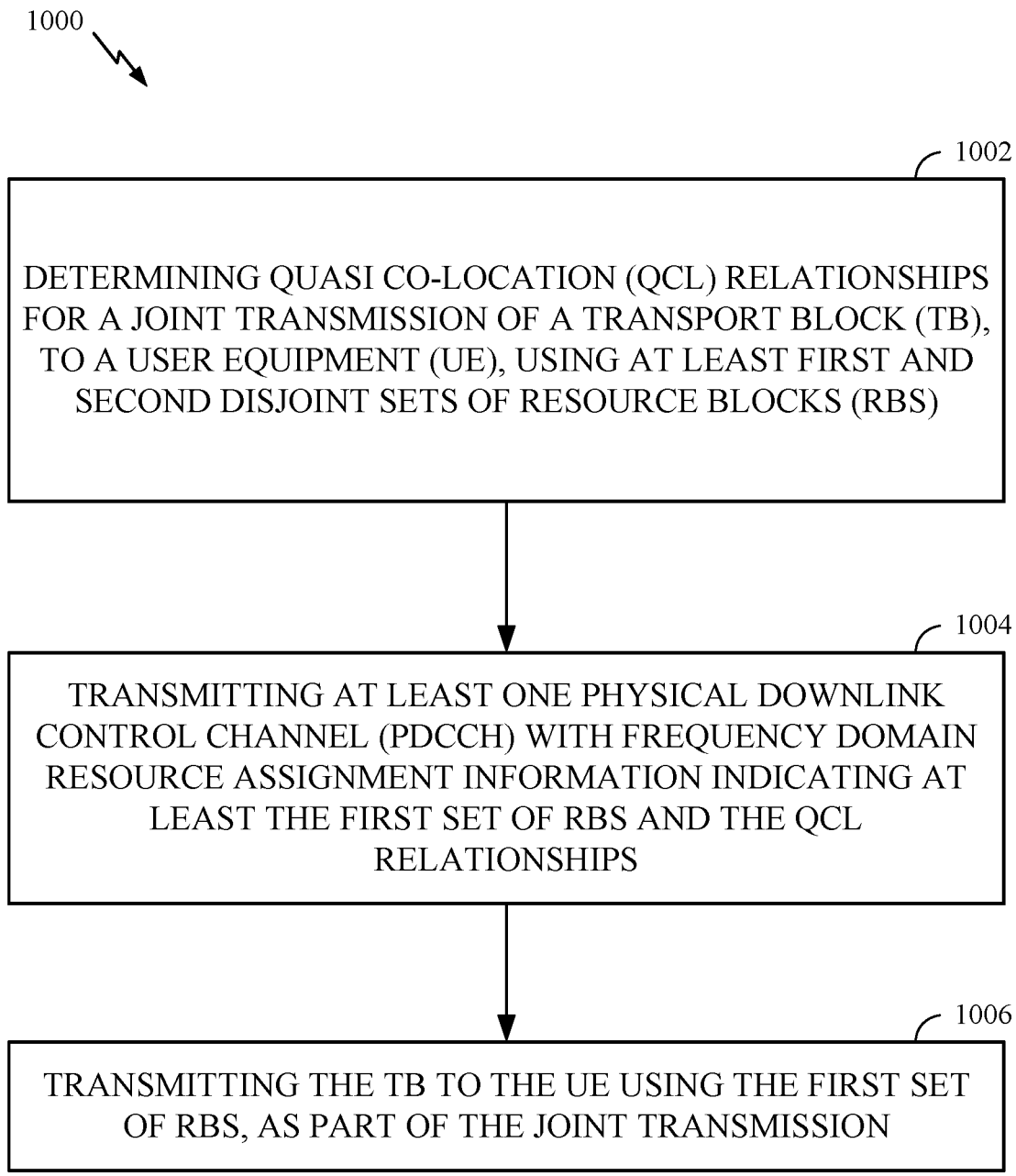
FIG. 10 is a flow diagram illustrating example operations that may be performed by a network entity, in accordance with certain aspects of the present disclosure.
Figure 11:
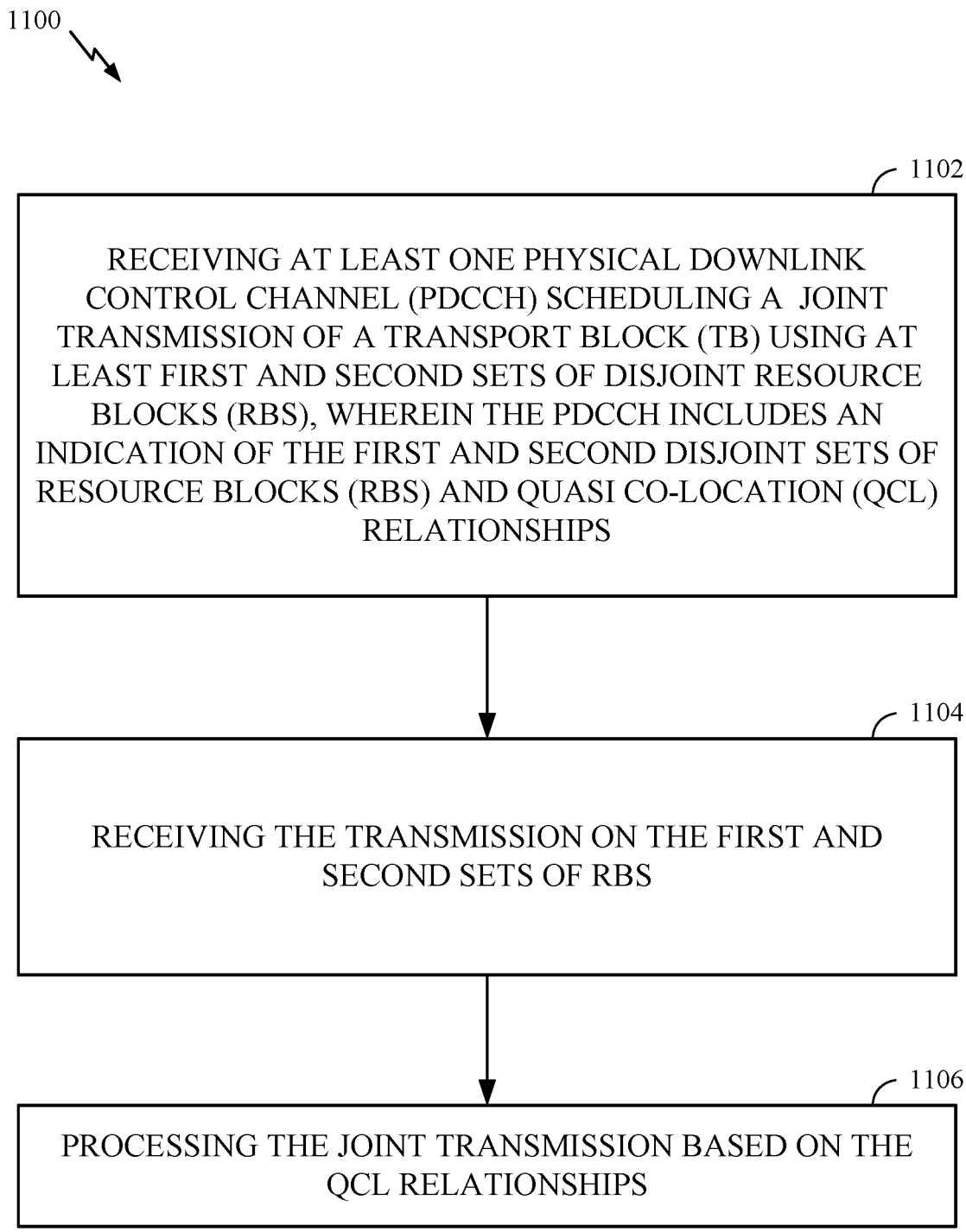
FIG. 11 is a flow diagram illustrating example operations that may be performed by a user equipment (UE), in accordance with certain aspects of the present disclosure.

The controllers/processors 440 and 480 may direct the operation at the BS 110 and the UE 120, respectively, to perform operations 1000 of FIG. 10 and operations 1100 of FIG. 11, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
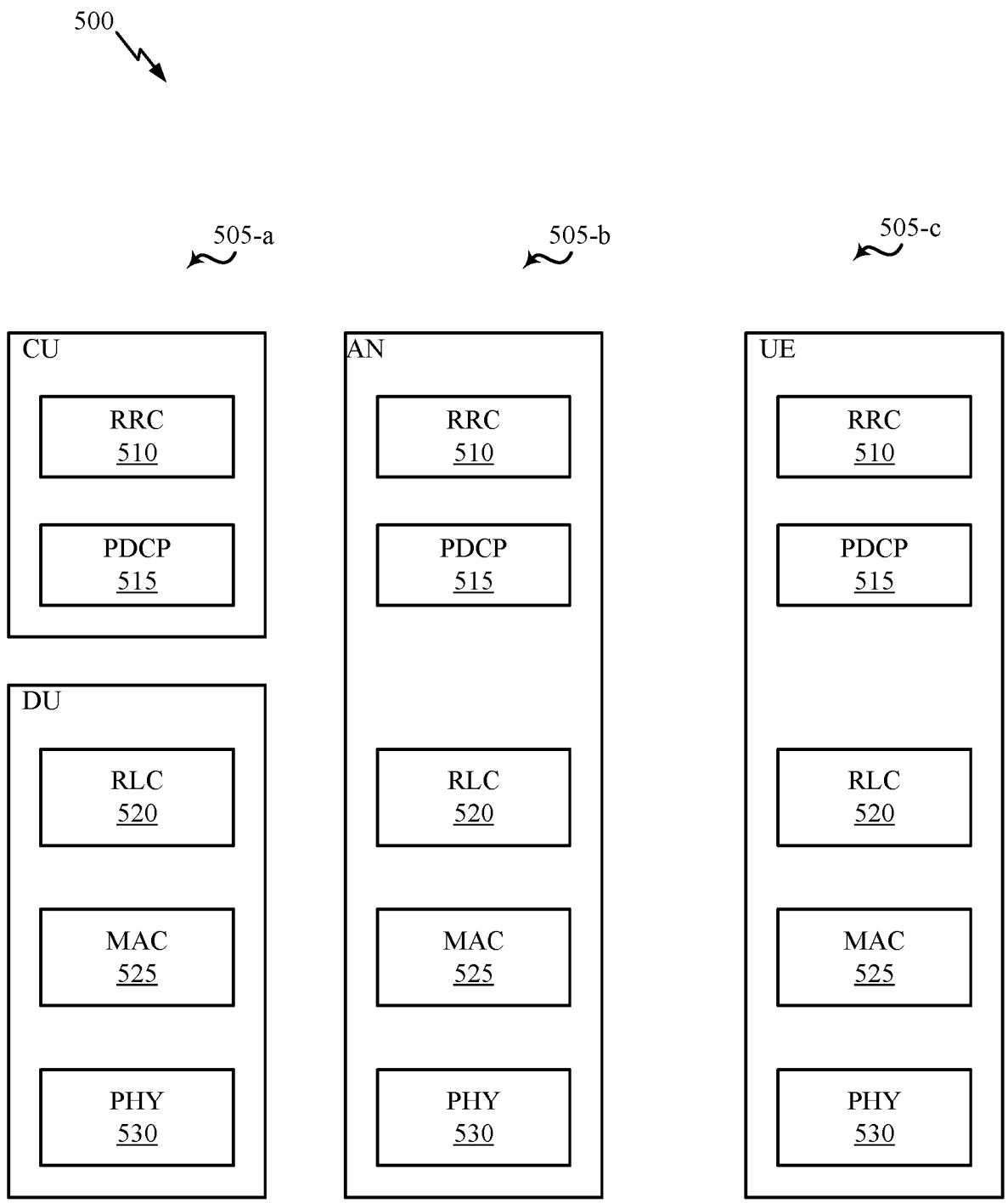
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a RRC layer 510, a PDCP layer 515, a RLC layer 520, a MAC layer 525, and a PHY layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, ... slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
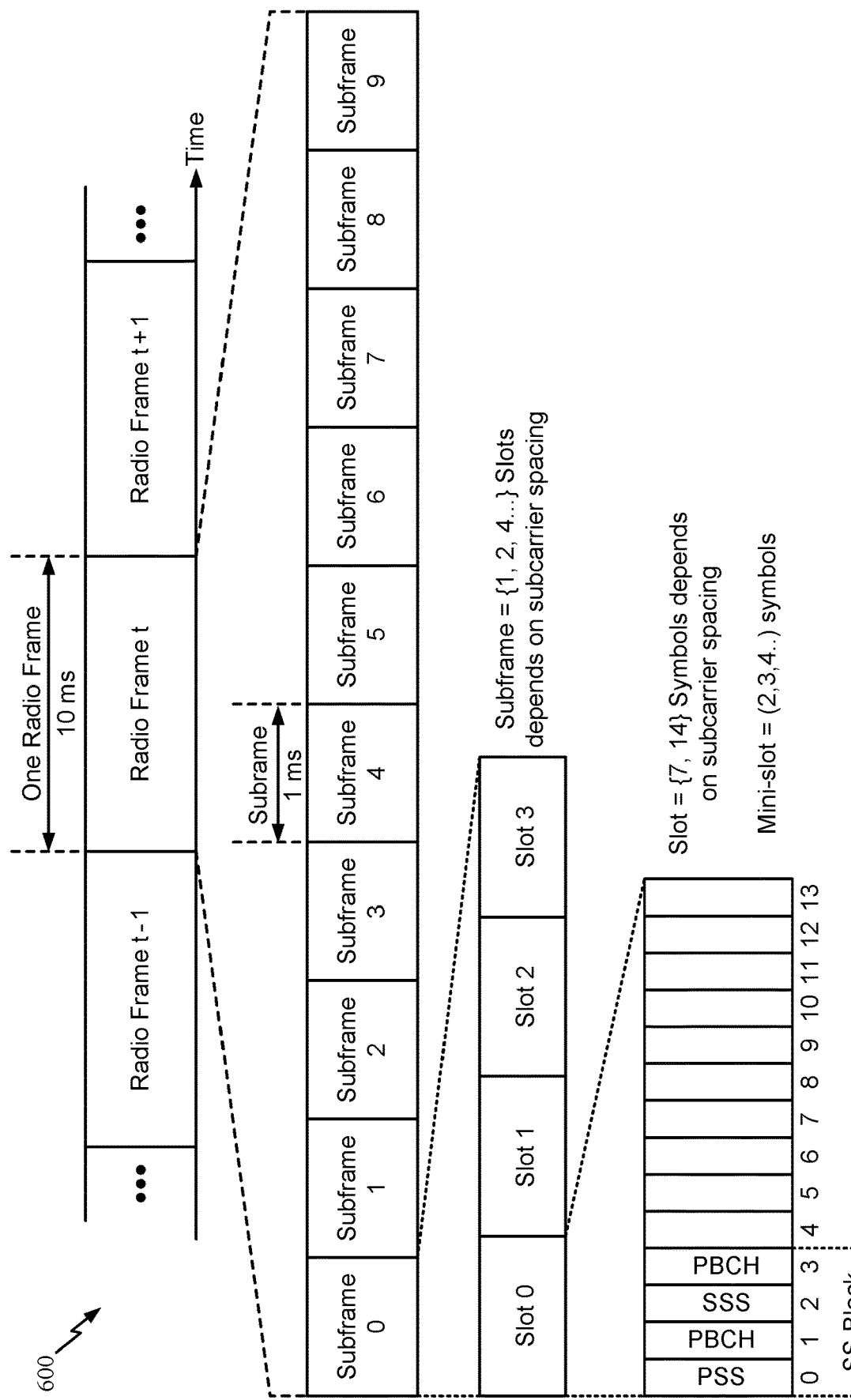
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Certain systems perform encoding for some physical channels. For example, some systems perform low-density parity check (LDPC) encoding. LDPC involve encoding using a base graph with variable nodes corresponding systematic information bits and parity bits and associated check nodes. The encoding may involve lifting the base graph and interconnecting edges in the base graph using cyclic integer lifting values. The base graph is associated with a code rate, which is sometimes referred to as the mother code rate. For example, a first base graph (referred to as BG1, having N=3K) may have a ⅓ rate and a second base graph (referred to as BG2, having N=5K) may be a ⅕ rate. Rate matching may be performed to achieve different code rates, for example, based on available transmission resources at the transmitting device. Puncturing may be performed to drop one or more information bits. Rate matching includes bit selection and interleaving. In some examples, polar coding or other coding the may be used.

Figure 7:
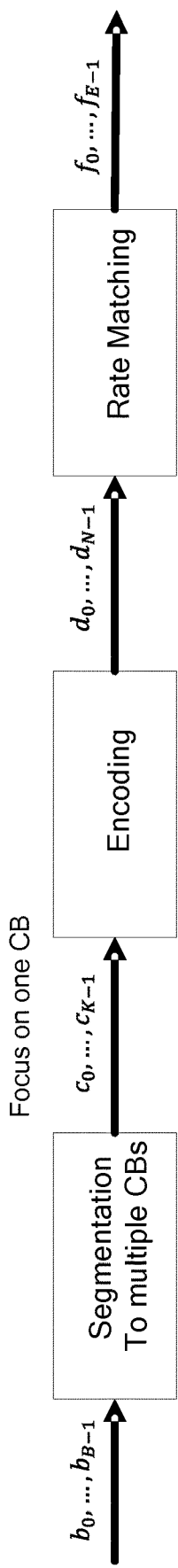
FIG. 7 is a block diagram illustrating an example encoding chain, in accordance with certain aspects of the present disclosure.

FIG. 7 is a block diagram illustrating an example encoding chain, in accordance with certain aspects of the present disclosure. As shown in FIG. 7, a transport block (TB) is segmented into one or more code blocks (CBs), for example, if the TB size is larger than a threshold. The CBs are then encoded. The coded bit sequence for the CB includes information bits and parity bits. After the encoding (and before constellation mapping), rate matching is performed on the coded bits. Each CB may be encoded and rate matched separately.

Example Multi-TRP Transmissions

Certain systems support multiple transmission reception point (multi-TRP) transmission. In a multi-TRP scenario, the same transport block and/or code block (TB/CB) with the same information bits (but can be different coded bits) is transmitted from multiple TRPs, such as two TRPs. The UE considers the transmissions from both TRPs and jointly decodes the transmissions. In some examples, the transmissions from the TRPs is at the same time (e.g., in the same slot, mini-slot, and/or in the same symbols), but across different resource blocks (RBs) and/or different layers. The number of layers and/or the modulation order from each TRP can be the same or different. In some examples, the transmissions from the TRPs can be at different times (e.g., in two consecutive mini-slots or slots). In some examples, the transmissions from the TRPs can be a combination of the above.

Figure 8:
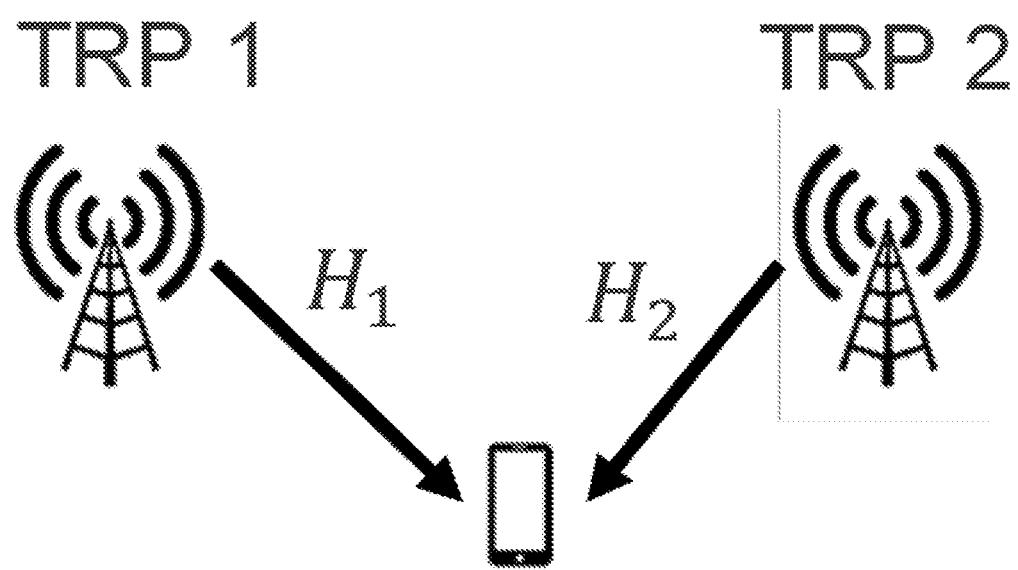
FIG. 8 is a diagram illustrating an example multiple transmission reception point (TRP) transmission scenario, in accordance with certain aspects of the present disclosure.

FIG. 8 is a diagram illustrating an example multi-TRP transmission scenario, in accordance with certain aspects of the present disclosure. As shown in FIG. 8, the UE receives a same packet/TB/CB from both TRP 1 and TRP 2 at the same time. In some examples, the TRPs transmit using disjoint resource sets. For example, TRP 1 transmit with resource set 1 and TRP 2 transmits with resource set 2.

Figure 9A:
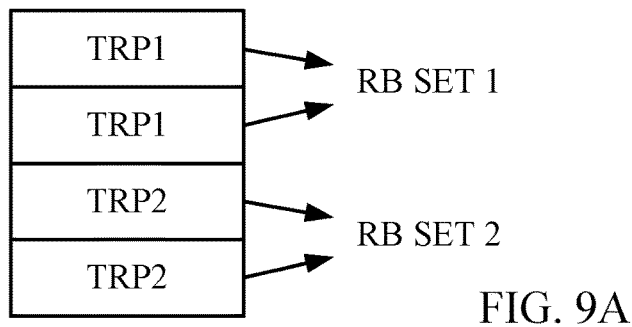
FIGS. 9A-9D illustrate example disjoint resource sets for TRPs, in accordance with certain aspects of the present disclosure.
Figure 9B:
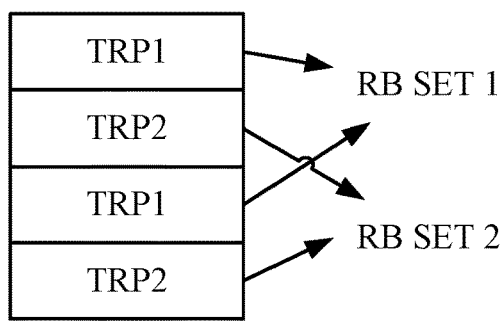
Figure 9C:
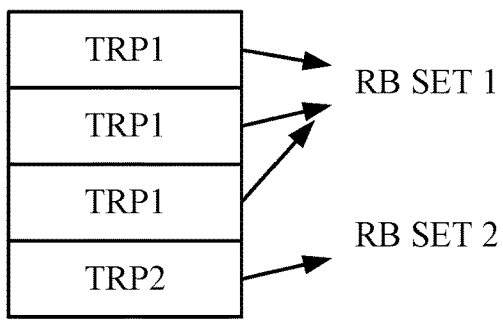
Figure 9D:
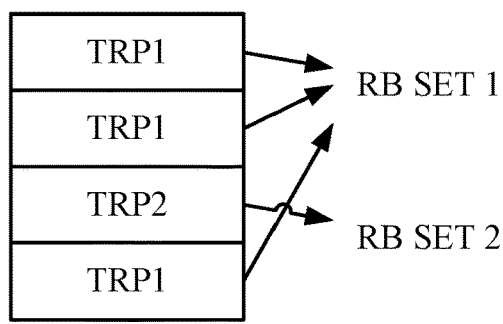

FIGS. 9A-9D illustrate example disjoint resource sets for TRPs, in accordance with certain aspects of the present disclosure. The disjoint resources for the TRPs may be localized or distributed. FIG. 9A and FIG. 9C illustrate localized resources and FIG. 9B and FIG. 9D illustrate distributed resources. The disjoint resources for the TRPs may have equal split or un-equal split. FIG. 9A and FIG. 9B illustrate equal split of resources and FIGS. 9C and FIG. 9D illustrate unequal split of resources. Each unit may be one RB, a resource block group (RBG), or precoding RBG (PRG).

Example PDCCH Signaling for Multi-TRP Transmissions With Disjoint RBs

In certain systems, such as NR (e.g., new radio or 5G) systems, data associated with a codeword is mapped to one or more demodulation reference signal (DMRS) ports. DMRS ports may be quasi collocated. Quasi-collocated DMRS ports share a set of quasi collocation (QCL) parameters.

The set of parameters can be signaled by higher layer signaling, such as radio resource control (RRC) signaling. For example, the set of parameters can be signaled as a QCL-type. The QCL-type may be associated with a combination (e.g., set) of QCL relationships. In some examples, a QCL-TypeA indicates the DMRS ports are QCL with respect to Doppler shift, Doppler spread, average delay, and delay spread; QCL-TypeB indicates the DMRS ports are QCL with respect to Doppler shift, and Doppler spread; QCL-TypeC indicates the DMRS are QCL with respect to average delay and Doppler shift; and QCL-TypeD indicates the DMRS ports are QCL with respect to Spatial Rx parameter. Different groups of DMRS ports can share different sets of QCL relationships.

While examples below refer to multi-TRP transmissions involving multiple TRPs, the techniques presented herein may also be applied to "multi-panel" transmissions involving multiple antenna panels of a same TRP. As described above, a joint transmission may involve multiple sets of resources that may at least partially overlap or may be disjoint. Each set of resources may be associated with (allocated to) a different TRP (or different panel of a multi-panel TRP). As described herein, transmission on each set of resources may have its own associated transmission parameters (e.g., different modulation order and/or number of layers) and/or Transmission Configuration Indicator States. TCI states are generally dynamically sent over in a DCI message that includes configurations such as quasi co-location (QCL) relationships between the DL RSs in one CSI-RS set and the PDSCH DMRS ports.

A UE may be RRC configured with a list of up to M candidate Transmission Configuration Indication (TCI) states at least for the purposes of QCL indication. A MAC-CE may be used to select up to $2^N$ TCI states out of M for PDSCH QCL indication, such that N bits in DCI can dynamically indicate the TCI state for the PDSCH transmission (e.g. if N=3, $2^N$=8). Each TCI state consists of one RS set for different QCL types (DL RS: SSB and AP/P/SP-CSI-RS/TRS).

Each tracking reference signal (TRS) can be used as a reference RS for power delay profile (PDP) calculation (typeA/C) when configured in a TCI state, which will be used for channel estimation of DMRS. A system may also support an extended QCL indication of DM-RS for PDSCH via DCI signaling for multi-TRP transmission, where each TCI state can refer to one or two RS sets, which indicates a QCL relationship for one or two DMRS port group (s), respectively.

Unfortunately, it is not clear what QCL relationships to apply for a Multi-TRP PDSCH transmission where the same TB (different coded bits or the same coded bits) is transmitted to the UE on two disjoint set of RBs in the same slot/symbols. For demodulation, the UE needs to perform channel estimation (CE), separately for each TRP. Separate PDP assumptions (QCL) for CE are also needed for the two RB sets.

Aspects of the present disclosure provide techniques for signaling relevant QCL relationships for CE for a UE to use to process a joint (e.g., multi-TRP) transmission sent using disjoint RBs.

FIG. 10 is a flow diagram showing example operations 1000 for wireless communications by a network entity, in accordance with certain aspects of the present disclosure. The operations 1000 may be performed by a transmitting entity, such as a BS 110 of FIG. 1 or TRP 208 of FIG. 2.

Operations 1000 begin, at 1002, by determining quasi co-location (QCL) relationships for a joint transmission of a transport block (TB) using at least first and second disjoint sets of resource blocks (RBs).

From the TRP perspective, the QCL relationships may be determined as follows. First, each TRP may send at least one RS signal (SSB and AP/P/SP-CSI-RS/TRS) that is QCLed with DMRS corresponding to transmission from that TRP. Second, all TRPs (both if only 2) jointly determine the TCI state (for the case of one DCI) in the DCI field. In this case, this TCI state refers to both RS sets (from TRP1 and from TRP2) and this TCI state indicates the QCL relationships.

The TCI state may be signaled via a TCI field in DCI that indicates QCL relationship. The actual QCL relationships may be derived at the UE side based on the RS associated with the QCL relationship indicated in the TCI field. In some cases, the TCI field of the DCI may include multiple bits (e.g., 3 bits) with some values used to indicate multiple TCI states. For example, 1 code point could indicate TCI state 1, while a second code point indicates TCI states 2 and 3. In case multiple TCI states are indicated, one may apply to one disjoint set of RBs, while the other applies to a second disjoint set of RBs. Each TCI state may be associated with a different TRP or a different antenna panel in the case of a multi-panel TRP.

At 1004, the network entity transmits at least one physical downlink control channel (PDCCH) with frequency domain resource assignment (FDRA) information indicating at least the first set of RBs and at least the QCL relationships. At 1006, the network entity transmits the TB to the UE using the first set of RBs, as part of the joint transmission.

FIG. 11 is a flow diagram showing example operations 1100 for wireless communications by a user equipment (UE), in accordance with certain aspects of the present disclosure. Operations 1100 may be performed, for example, by a UE such as a UE 120 of FIG. 1 to process a transmission sent via NC-JT (e.g., by a TRP performing operations 1000 of FIG. 10).

Operations 1100 begin, at 1102, by receiving at least one physical downlink control channel (PDCCH) scheduling a joint transmission of a transport block (TB) using at least first and second sets of disjoint resource blocks (RBs), wherein the PDCCH includes an indication of at least the first and second disjoint sets of resource blocks (RBs) and quasi co-location (QCL) relationships.

As noted above, the QCL relationships may be indicated via one or more TCI states. The UE may thus determine the QCL relationships based on the TCI state and the frequency resource assignment (including distinguishing RB set 1 and RB set2 as described herein), using the corresponding RS for the corresponding RB set.

At 1104, the UE receives the joint transmission of the TB on the first and second sets of RBs. At 1106, the UE processes the joint transmission based on the QCL relationships.

Various solutions are provided for signaling QCL relationships via PDCCH (DCI) with relevant QCL relationships for CE for a UE to use to process a multi-TRP transmission.

In a first case, a single PDCCH may be sent to signal the relevant QCL relationships. The single PDCCH could come from either one of the TRPs (or both). In another case, two separate PDCCHs may be sent, each signaling the relevant QCL relationships for each of TRPs (or sets of RBs). Both PDCCHs might come from the corresponding TRPs, or each PDCCH could come separately from both TRPs.

The PDCCH may also carry the frequency domain resource allocation (FDRA). There are various types of frequency domain resource allocation types and the type indicates how the RBs assigned for PDSCH or PUSCH are signaled. For example, resource allocation (RA) type 0 is resource block group based (RBG)-based. An RBG is a group of RBs. If a total number of RBGs is N_RBG in a BWP, this field is a N_RBG bitmap indicating the scheduled RBGs out of all N_RBG RBGs (e.g., as a bitmap).

RA type 1 is Contiguous virtual resource block (VRB) based. In this case, the field effectively indicates the start RB as well as the number of RBs. There is a separate filed VRB-PRB mapping which, if is set to 1, indicates PRBs are not contiguous anymore (while VRBs still contiguous) and are distributed.

As noted above, in some cases a single PDCCH may signal the resources and QCL relationships for a joint transmission. In this case, one frequency domain resource assignment is signaled to the UE which contains both RB sets (RB set 1 for TRP 1, and RB set 2 for TRP2). QCL information depends on the RB set (Set1/Set2): Each set may be assumed to be QCLed with a CSI-RS/TRS coming from the two TRPs, respectively. A TCI state can refer to both RS sets, which indicates two QCL relationships out of which is used based on RB set.

In general, the UE needs some type of indication of which resource unit (RB/RBG/PRG) corresponds to which of the two QCLs (e.g., corresponds to which of the two TRPs/RB sets). In the case of RA type 0, for each RBG, the UE needs to know which of the three possibilities for each RB: not scheduled, scheduled corresponding to QCL 1 (TRP1), or scheduled corresponding to QCL 2 (TRP2).

Overall, the total number ($3^{N\_RBG}$) of possibilities require log $2(3^{N\_RBG})$ bits, which is a fewer number of bits than separate PDCCH indication (2*N_RBG bits). This approach works for all the RB set cases mentioned above, with reference to FIG. 9 (localized vs distributed; equal vs unequal) and is the most general case, but number of bits needed for this indication is typically larger.

In some cases, for RA type 1 (contiguous VRB), there may be an equal split of resources (e.g., RB set 1 and RB set 2 have the same number of RBs). In this case, a one bit indication may be required to indicate whether the first half is associated to QCL 1 (TRP 1) or the second half. An additional one bit indication may also be needed to determine if RB sets are localized or distributed, which may be interpreted as follows:

If 0, first half and second half are contiguous (example 1 in slide 4); or

If 1, first half and second half are interleaved (example 2 in slide 4).

It may be noted that such a bit is different from the VRB-PRB mapping bit in regular DCI.

In some cases, for RA type 1 (contiguous VRB), there may be an unequal split of resources (e.g., RB set 1 and RB set 2 can have different number of RBs). In this case, a UE may need some indication of where the split happens between set 1 and set 2. log 2(N_Scheduled_RBs) bits may be required to indicate the last RB of the first set. However, to keep the DCI length independent of the number of scheduled RBs, log 2(N_Total_RBs) bits might be required, where N_Total_RBs is the total number of RBs in the active bandwidth part (BWP).

Alternatively, a limited split rule allowing only certain defined splits between the two TRPs may be defined to reduce the number of required bits. For example, only the following possibilities may be allowed: all TRP1, all TRP2, half-half, ¼ TRP1 and ¾ TRP2, ¾ TRP1 ¼ TRP2.

Similar to the case above, a one bit indication may be required to indicate whether the first part is associated to QCL 1 (TRP 1) or the second part (e.g. bottom ¾ of RBs or top ¾ of RBs from TRP1). A one bit indication may also be needed to determine if RB sets are localized or distributed, with possible interpretations:

If 0, first part and second part are contiguous (example 3 in slide 4); or

If 1, first part and second part are interleaved (example 4 in slide 4).

It may be noted that an interleaving rule needs to be defined as the two parts are unequal in this case In some cases, the resource assignment and QCL relationships may be sent in two separate PDCCHs. In other words, there may be two separate frequency domain resource assignments signaled to the UE, each of which may contain one of the RB sets (RB set 1 for TRP 1, and RB set 2 for TRP2).

There are two CSI-RS/TRS coming from the two TRPs, respectively, for QCL references as before. Therefore, separate PDCCHs may be sent to indicate separate TCI states corresponding to the relevant RS. Each RB set may use the corresponding TCI state for CE of PDSCH. Both RA type 0 and 1 can be used in this approach independently for the two RB sets.

A UE may need to be aware of the fact that both PDCCHs schedule the same TB. In some cases explicit signaling may make a UE aware. For example, one bit in each of the DCIs (e.g. if both are one, then both grants are for a single TB). In other cases, the indication may be provided via implicit signaling. For example, when the UE is configured with this type of multi-TRP mode (RRC signaling) and time domain resources (slots/symbols) are the same (or partially overlapping) in both grants, the UE can assume that both DCIs are for a single TB.

In some cases, the QCL and resource information may be provided via a multi-stage PDCCH (e.g., having a common part, and TRP-specific part), similar to Case 2 since the information specific to each TRP comes in a separate PDCCH.

Depending on the approach selected, a UE may need to monitor for single-TRP vs multi-TRP for DCI monitoring. According to one option, (monitoring one DCI length for both cases), when UE is configured with Multi-TRP mode (RRC signaling), DCI may always be a multi-TRP DCI even if it is for a single-TRP transmission. In this case, DCI becomes a special case of multi-TRP DCI (with the same DCI length), e.g. all RBs belong to RB set 1 or RB set 2.

As an alternative, a UE may monitor for two separate DCIs with different lengths. In this case, when a UE configures with Multi-TRP mode (RRC signaling), the UE monitors multi-TRP DCI in addition to the regular single-TRP DCI. In some cases, DCI length may be the same for single and multi-TRP transmissions.

There are various limitations that may be needed for hypothesis sets in order to keep total number of blind decoding the same.

In some cases, the two RB sets may use the same MCS (repetition) with the same or different RVs (in which case a second RV corresponding to the second set may be needed) or they may use one joint MCS (different coded bits are transmitted across different RB sets). The two RB sets may use the same or different modulation order (in which case MCS field indicates the modulation order for RB set1 while a separate field may be needed to indicate the modulation order for RB set 2).

The DMRS ports can be the same for both RB sets when both are scheduled with the same rank. In case RB set 1 has rank1, and RB set 2 has rank2, some additional signaling may be required, such as: for RB set 1 use ports 1001, 1002, 1003 (rank 3); for RB set 2 use DMRS ports 1001, 1002 (rank2).

As described above, aspects of the present disclosure provide techniques for signaling PDCCH with relevant QCL relationships for CE for a UE to use to process a multi-TRP transmission sent using disjoint RBs. As noted above, Signaling for the cases above can be through one PDCCH/DCI or separate PDCCHs/DCIs Example Embodiments Embodiment 1: A method for wireless communications by a user equipment (UE), comprising receiving at least one physical downlink control channel (PDCCH) scheduling a joint transmission of a transport block (TB) involving at least first and second disjoint sets of resource blocks (RBs), wherein the PDCCH includes an indication of the at least first and second disjoint sets of RBs and quasi co-location (QCL) parameters, receiving the joint transmission of the TB on the first and second sets of RBs, and processing the joint transmission of the TB based on the QCL relationships.

Embodiment 2: The method of Embodiment 1, wherein the QCL relationships are indicated via at least two Transmission Configuration Indicator (TCI) states.

Embodiment 3: The method of any of Embodiments 1-2, wherein the at least two TCI states are indicated by a TCI field code point of the DCI that maps to the two TCI sates.

Embodiment 4: The method of any of Embodiments 1-2, wherein each of the two TCI states is associated with one of the first or second sets of RBs.

Embodiment 5: The method of Embodiment 4, wherein each of the two TCI states is associated with one of a first transmission reception point (TRP) or a second TRP.

Embodiment 6: The method of any of Embodiments 1-4, wherein the at least one PDCCH comprises a single PDCCH that includes frequency domain resource assignment (FDRA) for both the first and second sets of RBs and QCL relationships for both the first and second sets of RBs.

Embodiment 7: The method of Embodiment 6, wherein the QCL relationships comprise first and second QCL relationships and the PDCCH comprises an indication of which QCL relationship corresponds to which of the first and second sets of RBs.

Embodiment 8: The method of Embodiment 7, wherein the frequency domain resource assignment is resource block group (RBG) based and the PDCCH includes an indication, for each RBG, of whether that RBG is unscheduled, scheduled and associated to the first QCL relationship, or scheduled and associated for the second QCL relationship.

Embodiment 9: The method of any of Embodiments 1-8, wherein the frequency domain resource assignment is contiguous virtual resource block (VRB) based and the PDCCH indicates which VRBs are associated with which QCL relationship.

Embodiment 10: The method of Embodiment 9, wherein the first and second sets of RBs each have the same number of RBs, the PDCCH indicates which half of the RBs are associated with which QCL relationship, and the PDCCH indicates whether the RBs are contiguous or interleaved.

Embodiment 11: The method of any of Embodiments 1-10, wherein the first and second sets of RBs are split unequally with different numbers of RBs, the PDCCH indicates which split of the RBs are associated with which QCL relationship, and the PDCCH indicates whether the RBs are contiguous or interleaved.

Embodiment 12: The method of Embodiment 11, wherein the indication of which split of the RBs are associated with which QCL relationship comprises an indication of one of a limited number of possible split combinations.

Embodiment 13: The method of any of Embodiments 1-12, wherein the at least one PDCCH comprises a first PDCCH that includes frequency domain resource assignment for only the first set of RBs and QCL relationships for the first TRP.

Embodiment 14: The method of Embodiment 13, wherein the second TRP transmits a second PDCCH that includes frequency domain resource assignment for only the second set of RBs and QCL relationships for the second TRP and the first and second PDCCH each indicate the downlink control information (DCI) carried therein is for the same TB.

Embodiment 15: The method of Embodiment 14, wherein the UE determines the DCI in the first and second PDCCH are for the same TB based on at least one of configuration of the UE to receive multi-TRP transmissions or a determination that time domain resources in the two DCI at least partially overlap.

Embodiment 16: The method of any of Embodiments 1-15, wherein both the first and second PDCCHs are received from the first TRP.

Embodiment 17: The method of any of Embodiments 1-16, wherein the at least one PDCCH comprises a first part common to both the first and second TRPs and a second part that is TRP-specific.

Embodiment 18: The method of any of Embodiments 1-17, wherein the UE monitors for a same length of downlink control information (DCI) for both multi-TRP DCI and single-TRP DCI.

Embodiment 19: The method of any of Embodiments 1-18, wherein the UE monitors a different length of downlink control information (DCI) for both multi-TRP DCI than for single-TRP DCI.

Embodiment 20: A method for wireless communications by a first transmission reception point (TRP), comprising determining quasi co-location (QCL) parameters for a joint transmission of a transport block (TB) using at least first and second disjoint sets of resource blocks (RBs), transmitting at least one physical downlink control channel (PDCCH) with frequency domain resource assignment (FDRA) information indicating at least the first set of RBs and at least the QCL relationships, and transmitting the TB to the UE using the first set of RBs, as part of the joint transmission.

Embodiment 21: The method of Embodiment 20, wherein the QCL relationships are indicated via at least two Transmission Configuration Indicator (TCI) states.

Embodiment 22: The method of any of Embodiments 20-21, wherein the at least two TCI states are indicated by a TCI field code point of the DCI that maps to the two TCI sates.

Embodiment 23: The method of any of Embodiments 20-22, wherein each of the two TCI states is associated with one of the first or second sets of RBs.

Embodiment 24: The method of Embodiment 23, wherein each of the two TCI states is associated with one of the first TRP or a second TRP.

Embodiment 25: The method of any of Embodiments 20-24, wherein the at least one PDCCH comprises a single PDCCH that includes frequency domain resource assignment for both the first and second sets of RBs and QCL relationships for both the first and second sets of RBs.

Embodiment 26: The method of Embodiment 25, wherein the QCL relationships comprise first and second QCL relationships and the PDCCH comprises an indication of which QCL relationship corresponds to which of the first and second sets of RBs.

Embodiment 27: The method of Embodiment 26, wherein the frequency domain resource assignment (FDRA) is resource block group (RBG) based and the PDCCH includes an indication, for each RBG, of whether that RBG is unscheduled, scheduled and associated to the first QCL relationship, or scheduled and associated for the second QCL relationship.

Embodiment 28: The method of any of Embodiments 20-27, wherein the frequency domain resource assignment is contiguous virtual resource block (VRB) based and the PDCCH indicates which VRBs are associated with which QCL relationship.

Embodiment 29: The method of Embodiment 28, wherein the first and second sets of RBs each have the same number of RBs, the PDCCH indicates which half of the RBs are associated with which QCL relationship, and the PDCCH indicates whether the RBs are contiguous or interleaved.

Embodiment 30: The method of any of Embodiments 20-29, wherein the first and second sets of RBs are split unequally with different numbers of RBs, the PDCCH indicates which split of the RBs are associated with which QCL relationship, and the PDCCH indicates whether the RBs are contiguous or interleaved.

Embodiment 31: The method of Embodiment 30, wherein the indication of which split of the RBs are associated with which QCL relationship comprises an indication of one of a limited number of possible split combinations.

Embodiment 32: The method of any of Embodiments 20-31, wherein the at least one PDCCH comprises a first PDCCH that includes frequency domain resource assignment for only the first set of RBs and QCL relationships for the first TRP.

Embodiment 33: The method of Embodiment 32, wherein the second TRP transmits a second PDCCH that includes frequency domain resource assignment for only the second set of RBs and QCL relationships for the second TRP and the first and second PDCCH each indicate the downlink control information (DCI) carried therein is for the same TB.

Embodiment 34: The method of any of Embodiments 20-33, further comprising transmitting a second PDCCH that includes frequency domain resource assignment for only the second set of RBs and QCL relationships for the second TRP.

Embodiment 35: The method of any of Embodiments 20-34, wherein the at least one PDCCH comprises a first part common to both the first and second TRPs and a second part that is TRP-specific.

Embodiment 36: The method of any of Embodiments 20-35, wherein multi-TRP downlink control information (DCI) carried in the at least one PDCCH has a same length as single-TRP DCI.

Embodiment 37: The method of any of Embodiments 20-36, wherein multi-TRP downlink control information (DCI) carried in the at least one PDCCH has a different length as single-TRP DCI.

Embodiment 38: An apparatus for wireless communications by a user equipment (UE), comprising means for receiving at least one physical downlink control channel (PDCCH) scheduling a multi-TRP transmission of a transport block (TB) from at least first and second transmission reception points (TRPs), wherein the PDCCH includes an indication of at least first and second disjoint sets of resource blocks (RBs) and quasi co-location (QCL) parameters, means for receiving the multi-TRP transmission of the TB on the first and second sets of RBs, and means for processing the multi-TRP transmission of the TB based on the QCL relationships.

Embodiment 39: An apparatus for wireless communications by a first transmission reception point (TRP), comprising means for determining quasi co-location (QCL) parameters for at least the first TRP for a multi-TRP transmission of a transport block (TB), from the first TRP and at least a second TRP to a user equipment (UE), using at least first and second disjoint sets of resource blocks (RBs), means for transmitting at least one physical downlink control channel (PDCCH) with frequency domain resource assignment (FDRA) information indicating at least the first set of RBs and at least the QCL relationships, and means for transmitting the TB to the UE using the first set of RBs, as part of the multi-TRP transmission.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 1000 of FIG. 10 may be performed by the various processors of the base station 110 shown in FIG. 4, while operations 1100 of FIG. 11 may be performed by the various processors of the base station 120 shown in FIG. 4

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
   receiving a single physical downlink control channel (PDCCH) scheduling a joint transmission of a transport block (TB) involving at least first and second disjoint sets of resource blocks (RBs), wherein:
      the single PDCCH includes an indication of the at least first and second disjoint sets of RBs, first and second quasi co-location (QCL) relationships, and an indication of which QCL relationship corresponds to which of the first and second sets of RBs; and
      the single PDCCH includes a frequency domain resource assignment (FDRA) for both the first and second sets of RBs, wherein the FDRA is based on one of a plurality of resource mapping configurations, which is resource block group (RBG) based;
   receiving the joint transmission of the TB on the first and second sets of RBs; and
   processing the joint transmission of the TB based on QCL relationships, wherein the single PDCCH includes an indication, for each RBG, of whether that RBG is unscheduled, scheduled and associated to the first QCL relationship, or scheduled and associated for the second QCL relationship.

2. The method of claim 1, wherein the QCL relationships are indicated via at least two Transmission Configuration Indicator (TCI) states.

3. The method of claim 2, wherein the at least two TCI states are indicated by a TCI field code point of a downlink control information (DCI) that maps to the two TCI states.

4. The method of claim 2, wherein each of the two TCI states is associated with one of the first or second sets of RBs.

5. The method of claim 4, wherein each of the two TCI states is associated with one of a first transmission reception point (TRP) or a second TRP.

6. The method of claim 1, wherein:
   the one of a plurality of resource mapping configurations is contiguous virtual resource block (VRB) based; and
   the single PDCCH indicates which VRBs are associated with which QCL relationship.

7. The method of claim 6, wherein:
   the first and second sets of RBs each have the same number of RBs;
   the single PDCCH indicates which half of the RBs are associated with which QCL relationship; and
   the single PDCCH indicates whether the RBs are contiguous or interleaved.

8. The method of claim 6, wherein:
   the first and second sets of RBs are split unequally with different numbers of RBs;
   the single PDCCH indicates which split of the RBs are associated with which QCL relationship; and
   the single PDCCH indicates whether the RBs are contiguous or interleaved.

9. The method of claim 8, wherein the indication of which split of the RBs are associated with which QCL relationship comprises:
   an indication of one of a limited number of possible split combinations.

10. The method of claim 1, wherein the single PDCCH comprises:
    a first PDCCH that includes FDRA for only the first set of RBs and QCL relationships for a first TRP.

11. The method of claim 10, wherein:
    a second TRP transmits a second PDCCH that includes frequency domain resource assignment for only the second set of RBs and QCL relationships for the second TRP; and
    the first and second PDCCH each indicate downlink control information (DCI) carried therein is for the same TB.

12. The method of claim 11, wherein the UE determines the DCI in the first and second PDCCH are for the same TB based on at least one of:
    a configuration of the UE to receive multi-TRP transmissions; or
    a determination that time domain resources in the two DCI at least partially overlap.

13. The method of claim 10, wherein both the first and second PDCCHs are received from the first TRP.

14. The method of claim 1, wherein the single PDCCH comprises a first part common to both the first and second TRPs and a second part that is TRP-specific.

15. The method of claim 1, wherein the UE monitors for a same length of downlink control information (DCI) for both multi-TRP DCI and single-TRP DCI.

16. The method of claim 1, wherein the UE monitors a different length of downlink control information (DCI) for both multi-TRP DCI than for single-TRP DCI.

17. A method for wireless communications by a first transmission reception point (TRP), comprising:
    determining quasi co-location (QCL) parameters for a joint transmission of a transport block (TB) using at least first and second disjoint sets of resource blocks (RBs), and a frequency domain resource assignment (FDRA) for both the first and second sets of RBs, wherein the FDRA is based on one of a plurality of resource mapping configurations, wherein the one of a plurality of resource mapping configurations is resource block group (RBG) based and the PDCCH includes an indication, for each RBG, of whether that RBG is unscheduled, scheduled and associated to the first QCL relationship, or scheduled and associated for the second QCL relationship;
    transmitting a single physical downlink control channel (PDCCH) with FDRA information indicating at least the first set of RBs, at least first and second QCL relationships, and an indication of which QCL relationship corresponds to which of the first and second sets of RBs; and
    transmitting the TB to a user equipment (UE) using the first set of RBs, as part of the joint transmission.

18. The method of claim 17, wherein the QCL relationships are indicated via at least two Transmission Configuration Indicator (TCI) states.

19. The method of claim 18, wherein the at least two TCI states are indicated by a TCI field code point of the a downlink control information (DCI) that maps to the two TCI states.

20. The method of claim 18, wherein each of the two TCI states is associated with one of the first or second sets of RBs.

21. The method of claim 20, wherein each of the two TCI states is associated with one of the first TRP or a second TRP.

22. The method of claim 17, wherein the single PDCCH comprises:
a first PDCCH that includes FDRA for only the first set of RBs and QCL relationships for the first TRP.

23. The method of claim 22, wherein:
the a second TRP transmits a second PDCCH that includes frequency domain resource assignment for only the second set of RBs and QCL relationships for the second TRP; and
the first and second PDCCH each indicate downlink control information (DCI) carried therein is for the same TB.

24. The method of claim 22, further comprising transmitting a second PDCCH that includes FDRA for only the second set of RBs and QCL relationships for the a second TRP.

25. The method of claim 17, wherein the single PDCCH comprises a first part common to both the first and second TRPs and a second part that is TRP-specific.

26. The method of claim 17, wherein multi-TRP downlink control information (DCI) carried in the single PDCCH has a same length as single-TRP DCI.

27. The method of claim 17, wherein multi-TRP downlink control information (DCI) carried in the single PDCCH has a different length as single-TRP DCI.

28. A method for wireless communications by a first transmission reception point (TRP), comprising:
determining quasi co-location (QCL) parameters for a joint transmission of a transport block (TB) using at least first and second disjoint sets of resource blocks (RBs), and a frequency domain resource assignment (FDRA) for both the first and second sets of RBs, wherein the FDRA is based on one of a plurality of resource mapping configurations, wherein the one of a plurality of resource mapping configurations is contiguous virtual resource block (VRB) based and the PDCCH indicates which VRBs are associated with which QCL relationship;
transmitting a single physical downlink control channel (PDCCH) with FDRA information indicating at least the first set of RBs, at least first and second QCL relationships, and an indication of which QCL relationship corresponds to which of the first and second sets of RBs; and
transmitting the TB to a user equipment (UE) using the first set of RBs, as part of the joint transmission.

29. The method of claim 28, wherein:
the first and second sets of RBs each have the same number of RBs;
the single PDCCH indicates which half of the RBs are associated with which QCL relationship; and
the single PDCCH indicates whether the RBs are contiguous or interleaved.

30. The method of claim 28, wherein:
the first and second sets of RBs are split unequally with different numbers of RBs;
the single PDCCH indicates which split of the RBs are associated with which QCL relationship; and
the single PDCCH indicates whether the RBs are contiguous or interleaved.

31. The method of claim 30, wherein the indication of which split of the RBs are associated with which QCL relationship comprises:
an indication of one of a limited number of possible split combinations.

* * * * *